Sept. 27, 1938.  J. WOO  2,131,651
DISPENSING DEVICE
Filed Nov. 22, 1937  2 Sheets-Sheet 1
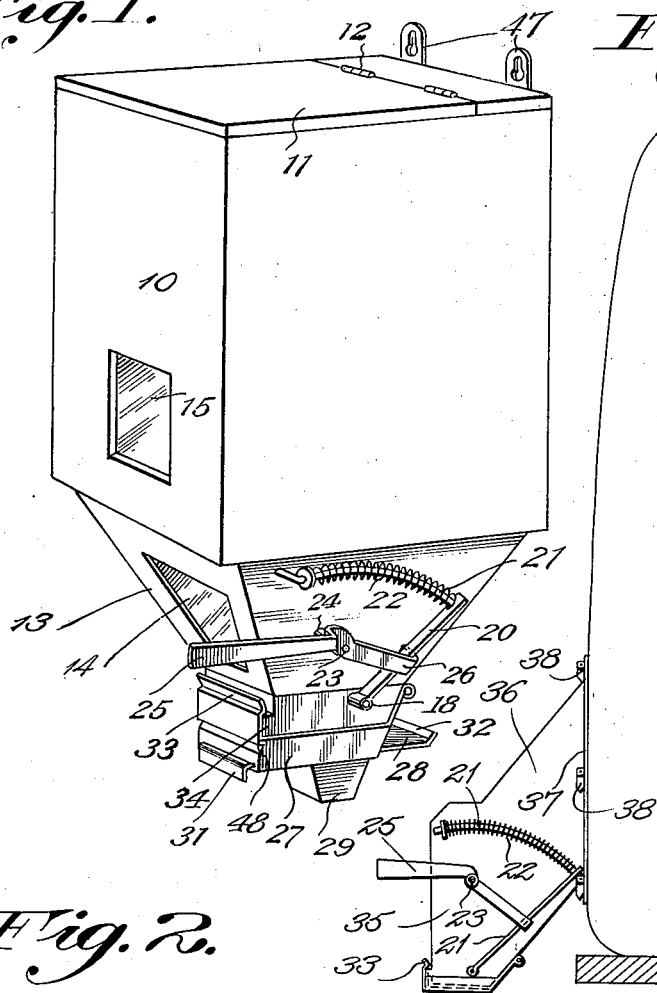
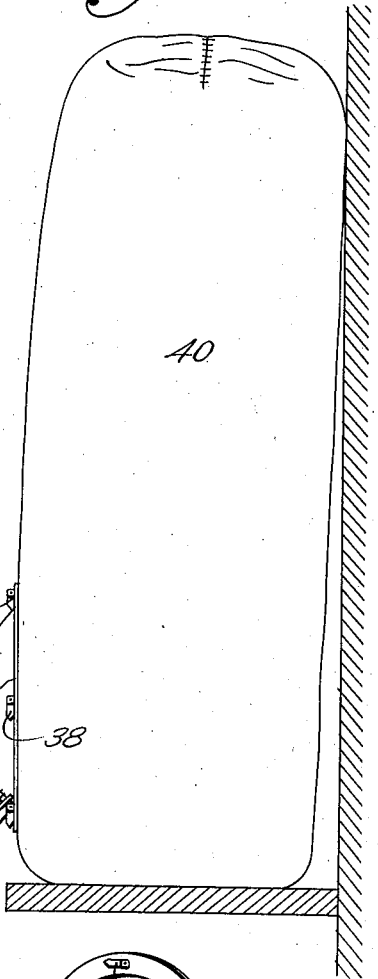
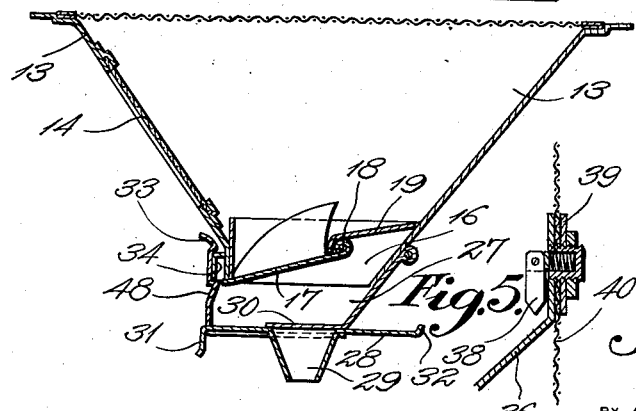
Jack Woo
INVENTOR
BY *Victor J. Evans & Co.*
ATTORNEYS Sept. 27, 1938.  J. WOO  2,131,651
DISPENSING DEVICE
Filed Nov. 22, 1937  2 Sheets-Sheet 2
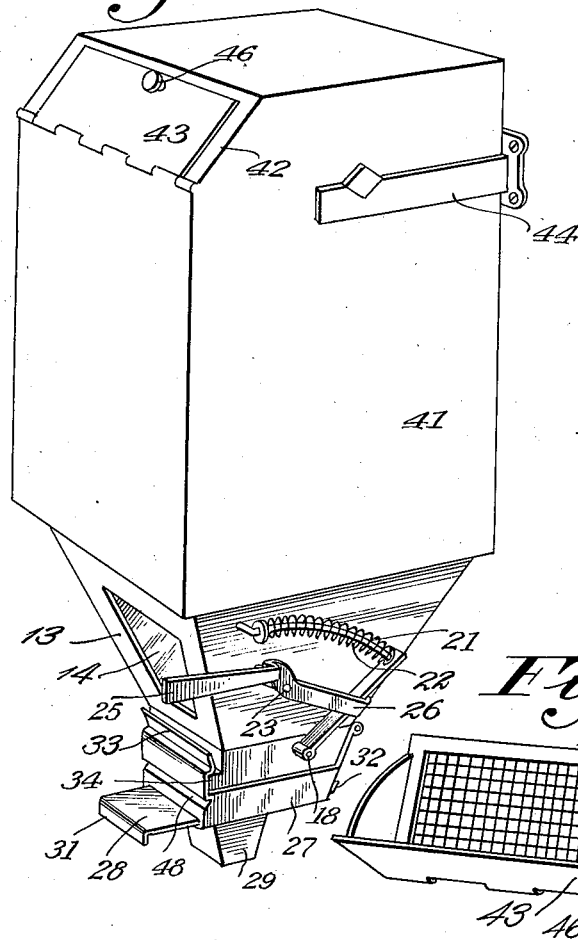
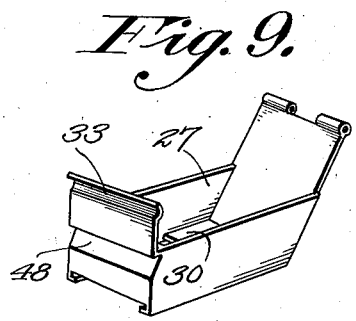
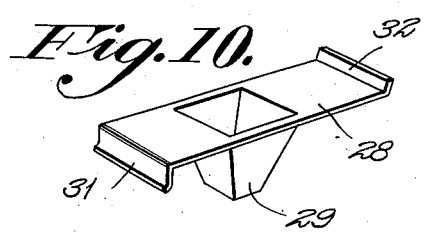
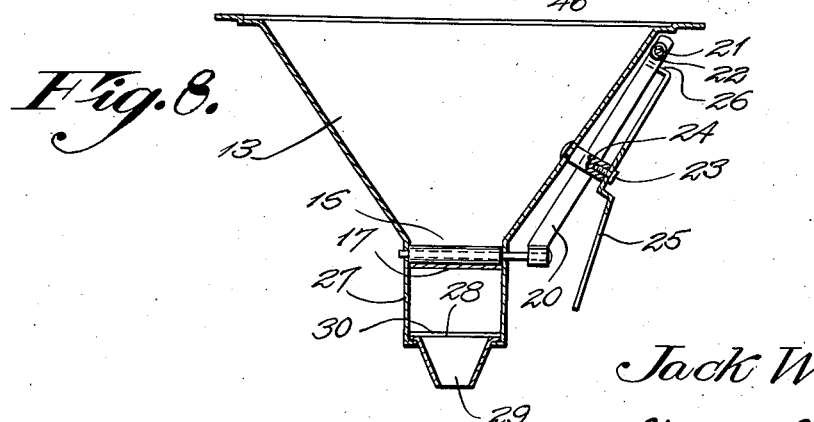
Jack Woo
INVENTOR
BY Victor J. Evans & Co.
ATTORNEYS Patented Sept. 27, 1938

2,131,651

UNITED STATES PATENT OFFICE 2,131,651

DISPENSING DEVICE

Jack Woo, Port Alice, British Columbia, Canada

Application November 22, 1937, Serial No. 175,931

4 Claims. (Cl. 221—146)

The invention relates to a dispensing device and more especially to a device for dispensing loose materials or commodities such as sugar or the like.

The primary object of the invention is the provision of a device of this character, wherein the material to be delivered therefrom can be dispensed for the filling of containers, particularly small containers, without the wasting or spilling of such material and in such manner that the material will be controlled during the flow thereof in the filling operation.

Another object of the invention is the provision of a device of this character, wherein the same is manually operated and is susceptible of connection with a holder for the loose material or as a permanent part thereof and assures the easy and convenient filling of containers.

A further object of the invention is the provision of a device of this character, wherein clogging of the material is avoided and also the material can be relieved of lumps so as to relieve the same from choking during the filling operation in the dispensing of the material from the device, the device being especially adaptable for filling sugar bowls or the like.

A still further object of the invention is the provision of a device of this character, which is simple in construction, thoroughly reliable and efficient in operation, enabling the easy and convenient filling of containers or receptacles and inexpensive to manufacture.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claims hereunto appended.

In the accompanying drawings:

Figure 1 is a perspective view of the device constructed in accordance with the invention.

Figure 2 is a fragmentary vertical sectional view thereof.

Figure 3 is a side elevation of a modified form of device.

Figure 4 is a perspective view of the fastening ring and adjuncts associated with the modified form shown in Figure 3.

Figure 5 is an enlarged fragmentary vertical sectional view through the ring and adjuncts.

Figure 6 is a perspective view of a further modification.

Figure 7 is a perspective view of the combined closure door and screen associated with the modified form shown in Figure 6.

Figure 8 is a fragmentary vertical sectional view through the device shown in Figure 6.

Figure 9 is a perspective view of a funnel carrier for the device.

Figure 10 is a perspective view of the funnel detached from the carrier.

Similar reference characters indicate corresponding parts throughout the several views in the drawings.

Referring to the drawings in detail, particularly Figures 1 and 2 inclusive, the device comprises in the preferred embodiment of the invention a box-like body 10 preferably made from sheet metal, wood or other material and is of the required size for holding loose commodities, for example, sugar, the body being open at its top and has at this point a hinged cover 11, the hinges being indicated at 12 for vertical swinging of said cover so that the commodity can be introduced into the body 10 to be subsequently dispensed therefrom for the filling of containers such as sugar bowls or other receivers.

Formed at the bottom of this body 10 is a discharge hopper 13, the front thereof being provided with a transparent window 14 and likewise the body 10 at its front has built therewith a transparent window 15 for inspection purposes. This hopper 13 at the open mouth 16 thereof has arranged within the latter a vertically swinging gate 17 swinging on a pivot 18 beneath a chute or lip 19 inclined in the direction of the gate 17 and directing flow thereto interiorly of said hopper.

The pivot 18 turns the gate 17 for the closing or opening thereof and has fixed thereto exteriorly of the hopper 13 a throw arm 20 riding an upwardly arched guide rod 21 about which surrounds a coiled tensioning spring 22 playing against the arm 20 for urging the gate to normal closed position. This rod is suitably supported exteriorly on the hopper 13. Pivoted at 23 on a fixed bearing 24 is a hand lever 25 providing a handle end which extends outwardly in a forward direction with relation to the hopper 13 for manual manipulation and this lever at the opposite inner end 26 fulcrums against the arm 20 and on the turning of the lever the arm will be acted upon for the swinging of the gate 17 to open position against the resistance of the spring 22. On the opening of the gate the contents of the body 10 will freely flow through the mouth 16 of the hopper for the filling of a container, receptacle or the like.

Hinged to the rear side of the hopper 13 is a funnel carrier 27 adapted to be swung into fitting relation to the mouth 16 of the hopper 13 or downwardly and rearwardly away from said hopper. This carrier 27 has fitted therein a slide 28 carrying a funnel 29 and in one position of the slide, which is manually actuated, the funnel is closed by an overhang 30 on the carrier to shut off communication of the funnel and the mouth 16 of the hopper 13 then on shifting the slide 28 to another position, the funnel is opened to the mouth 16, the purpose of the funnel being for the filling of small receptacles or receivers. The slide 28 has a finger grip 31 at its front end and a stop 32 at its rear end, the latter limiting the movement of the slide while the grip enables the manual shifting of such slide.

The carrier 27 carries a latch 33 engageable with a fixed keeper 34 on the hopper 13 and in this manner the said carrier is held in fitting relation to the mouth 16 of said hopper.

In Figures 3 and 4 of the drawings there is shown a modification of the device, wherein the hopper 35 is formed with a neck 36 with an external circular flange 37 having suitable holes or clearances for snap fasteners 38 on a clamping ring 39 which enables the fastening of the neck 36 of the hopper 35 to a bag, sack or the like 40 containing loose material, the said bag, sack or the like being perforated or punctured at the neck to allow free flow of its contents into the hopper 35 which enables the convenient dispensing of such contents for the filling of receivers.

In Figures 6 to 10 of the drawings there is shown a further modification of the invention, wherein the body 41 has a sloping upper front portion 42 providing a doorway for a swinging door 43 so that the body 41 can be filled with material to be dispensed thereby, the said body being hung upon a bracket 44 at each side thereof. This door 43 carries a screen 45 which is angled to the door and is adapted to cover the doorway when the said door is open so that material introduced into the body 41 can be screened thereby, the door and the screen in their unitary arrangement afford a trough for the material when fed into the body 41.

The door at its outer side carries a suitable hand knob 46 for manual control thereof.

By control of the gate 17, the desired quantity of the content of the device can be discharged and the user of the device can determine the amount within the device of content thereof. The box-like body 10 preferably made from sheet metal has provided at the upper portion thereof suspension ears 47 suitably perforated so that the said body can be hung conveniently upon a support, wall or the like.

The carrier 27 has struck inwardly therefrom a lip 48 limiting the inward swinging of the same and also coacting with the keeper 34 and latch 33 for maintaining the carrier fixed in its fitting relation to the mouth 16 of the hopper.

What is claimed is:

1. A device of the kind described comprising a hopper, a discharge mouth built in said hopper, a gate swingingly supported within the mouth, an arm swinging said gate, a guide saddled by said arm, a spring carried by the guide and active upon the arm to hold the gate under tension and closed, a hand lever swingably supported exteriorly of the hopper and acting upon the arm to move the same against the spring, a funnel carrier fitted with said mouth of the hopper, a slide in the carrier, and a funnel depending from said slide and movable to opening and closing positions with relation to said mouth.

2. A device of the kind described comprising a hopper, a discharge mouth built in said hopper, a gate swingingly supported within the mouth, an arm swinging said gate, a guide saddled by said arm, a spring carried by the guide and active upon the arm to hold the gate under tension and closed, a hand lever swingably supported exteriorly of the hopper and acting upon the arm to move the same against the spring, a funnel carrier fitted with said mouth of the hopper, a slide in the carrier, a funnel depending from said slide and movable to opening and closing positions with relation to said mouth, and means swingingly connecting the carrier to the hopper.

3. A device of the kind described comprising a hopper, a discharge mouth built in said hopper, a gate swingingly supported within the mouth, an arm swinging said gate, a guide saddled by said arm, a spring carried by the guide and active upon the arm to hold the gate under tension and closed, a hand lever swingably supported exteriorly of the hopper and acting upon the arm to move the same against the spring, a funnel carrier fitted with said mouth of the hopper, a slide in the carrier, a funnel depending from said slide and movable to opening and closing positions with relation to said mouth, means swingingly connecting the carrier to the hopper, and means for latching the carrier fitted with said hopper.

4. A device of the kind described comprising a hopper, a discharge mouth built in said hopper, a gate swingingly supported within the mouth, an arm swinging said gate, a guide saddled by said arm, a spring carried by the guide and active upon the arm to hold the gate under tension and closed, a hand lever swingably supported exteriorly of the hopper and acting upon the arm to move the same against the spring, a funnel carrier fitted with said mouth of the hopper, a slide in the carrier, a funnel depending from said slide and movable to opening and closing positions with relation to said mouth, means swingingly connecting the carrier to the hopper, means for latching the carrier fitted with said hopper, and means for separably fastening the hopper to a container for communication therewith.

JACK WOO.